US011321749B2

(12) United States Patent
Venkateswaran et al.

(10) Patent No.: US 11,321,749 B2
(45) Date of Patent: May 3, 2022

(54) METERING BASED ON APPLICATION CODE COMPLEXITY

(71) Applicant: Kyndryl, Inc., New York, NY (US)

(72) Inventors: Sreekrishnan Venkateswaran, Bengaluru (IN); Deepak Poola Chandrashekar, Bengaluru (IN); Jigar Navanitrai Kapasi, Bengaluru (IN); Madhusudan Kunigal Satyanarayana, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 562 days.

(21) Appl. No.: 16/254,728

(22) Filed: Jan. 23, 2019

(65) Prior Publication Data

US 2020/0234346 A1   Jul. 23, 2020

(51) Int. Cl.
*G06F 11/36* (2006.01)
*G06Q 30/02* (2012.01)
*G06F 16/28* (2019.01)

(52) U.S. Cl.
CPC ..... *G06Q 30/0283* (2013.01); *G06F 11/3616* (2013.01); *G06F 16/284* (2019.01)

(58) Field of Classification Search
CPC   G06Q 30/0283; G06F 11/3616; G06F 16/284
USPC ............... 705/400; 717/143; 707/748
See application file for complete search history.

(56) References Cited

U.S. PATENT DOCUMENTS

| | | | |
|---|---|---|---|
| 9,276,828 B2 | 3/2016 | Ravi et al. | |
| 10,162,729 B1* | 12/2018 | Snyder | G06F 40/205 |
| 10,303,517 B1* | 5/2019 | Sloyan | G06F 8/71 |
| 2009/0271324 A1 | 10/2009 | Jandhyala et al. | |
| 2010/0305991 A1* | 12/2010 | Diao | G06Q 10/04 706/46 |
| 2011/0138034 A1 | 6/2011 | Brookbanks et al. | |
| 2012/0060142 A1 | 3/2012 | Fliess et al. | |
| 2012/0330711 A1* | 12/2012 | Jain | G06F 9/5072 709/224 |
| 2014/0082410 A1* | 3/2014 | Ziakas | G06F 12/0811 711/105 |
| 2015/0278336 A1* | 10/2015 | Wadhwani | G06F 16/284 707/748 |
| 2016/0086133 A1* | 3/2016 | Srikanth | G06Q 10/103 705/301 |

(Continued)

OTHER PUBLICATIONS

Graylin Jay et al., "Cyclomatic Complexity and Lines of Code: Empirical Evidence of a Stable Linear Relationship", Apr. 2009, 7 pages (Year: 2009).*

(Continued)

*Primary Examiner* — Shannon S Campbell
*Assistant Examiner* — Freda A Nelson
(74) *Attorney, Agent, or Firm* — Yee & Associates, P.C.

(57) ABSTRACT

Metering based on application code complexity is provided. Code of an application to be executed is received from a user. Values of parameters corresponding to the application are extracted based on analysis of the code. A set of computational vectors corresponding to extracted values of the parameters of the application is generated to calculate a complexity of the code. A metering metric to charge the user to execute the application is determined based on the complexity of the code. The application is executed at the metering metric based on the complexity of the code.

19 Claims, 10 Drawing Sheets

(56) References Cited

U.S. PATENT DOCUMENTS

| | | |
|---|---|---|
| 2016/0094401 A1 | 3/2016 | Anwar et al. |
| 2016/0360009 A1 | 12/2016 | Borley et al. |
| 2017/0031800 A1* | 2/2017 | Shani ................... G06F 11/34 |
| 2017/0249231 A1* | 8/2017 | Bofferding .......... G06F 11/3604 |
| 2018/0068288 A1 | 3/2018 | Thompson |
| 2019/0196950 A1* | 6/2019 | Ranganathan ......... G06N 20/00 |
| 2020/0034530 A1* | 1/2020 | Zasadzinski ............ G06F 21/52 |
| 2020/0201689 A1* | 6/2020 | Laethem ................ G06F 9/543 |

OTHER PUBLICATIONS

Ogheneovo, Edward E., "On the Relationship between Software Complexity and Maintenance Costs", Journal of Computer and Communications, Feb. 2014, pp. 1-16 (Year: 2014).*

Mell et al., "The NIST Definition of Cloud Computing," National Institute of Standards and Technology Special Publication 800-145, Sep. 2011, 7 pages.

* cited by examiner

FIG. 8

| EXAMPLE C1 - APPLICATION VARIABLES VECTOR | 802 |
|---|---|
| # OF INPUT (INPUT * TYPE) VARIABLES | |
| # OF OUTPUT VARIABLES | |
| TYPE OF VARIABLES | |
| # OF VARIABLES | |
| TYPE OF DATA (REAL TIME, STATIC, DYNAMIC) | |
| SIZE OF DATA | |
| ACCURACY OF DATA | |

| EXAMPLE C2 - APPLICATION CODE EXECUTION CONTROLS VECTOR | 804 |
|---|---|
| # OF BRANCHES | |
| # OF LOOPS (NESTING) | |
| # OF RECURSIVE METHODS | |
| # OF EXECUTION PATHS | |
| DEGREE OF PARALLELISM (MULTITHREADING) | |
| # OF ALU INSTRUCTION | |
| # OF METHODS | |
| # OF LINES | |
| INTERPRETED/COMPILED CODE | |
| # OF SaaS/PaaS APIs INVOKED | |

| EXAMPLE C3 - APPLICATION EXECUTION VECTOR | 806 |
|---|---|
| DURATION OF EXECUTION | |
| SESSION BASED EXECUTION | |
| APPLICATION PERMISSIONS (ROLE BASED) | |

| EXAMPLE C4 - APPLICATION RESOURCE REQUIREMENTS VECTOR | 808 |
|---|---|
| MINIMUM RESOURCES REQUIRED (NETWORKING) | |
| # OF MEM BLOCKS ALLOCATED | |
| INTEGRATION WITH OTHER APPLICATIONS | |
| # OF LIBRARIES/PACKAGES USED | |
| CODE EXECUTION TIME - PEAK VS OFF-PEAK | |
| COMPLEXITY OF ENVIRONMENT NEEDED TO EXECUTE THE CODE | |
| SKILLS AND TECHNOLOGIES REQUIRED BY THE CODE | |

800
APPLICATION
CODE COMPLEXITY
COMPUTATIONAL VECTORS

COMPLEXITY SCORE
COMPUTATION TABLE
1100

| EXAMPLE C5 - VECTOR INPUT VARIABLES | NOTATIONS | VALUES |
|---|---|---|
| # OF SIMPLE LOOPS | l | 2 |
| # OF LOOP COUNTS/LOOP | X | 5 |
| # OF NESTED LOOPS | m | 1 |
| LOOP COUNT [POWER(INNER COUNT, OUTER COUNT)] | Y | 1 |
| # OF STMTS IN SIMPLE LOOP | x | 4 |
| # OF STATEMENTS IN NESTED LOOP | y | 5 |
| # OF STATEMENTS OUTSIDE LOOP | z | 10 |

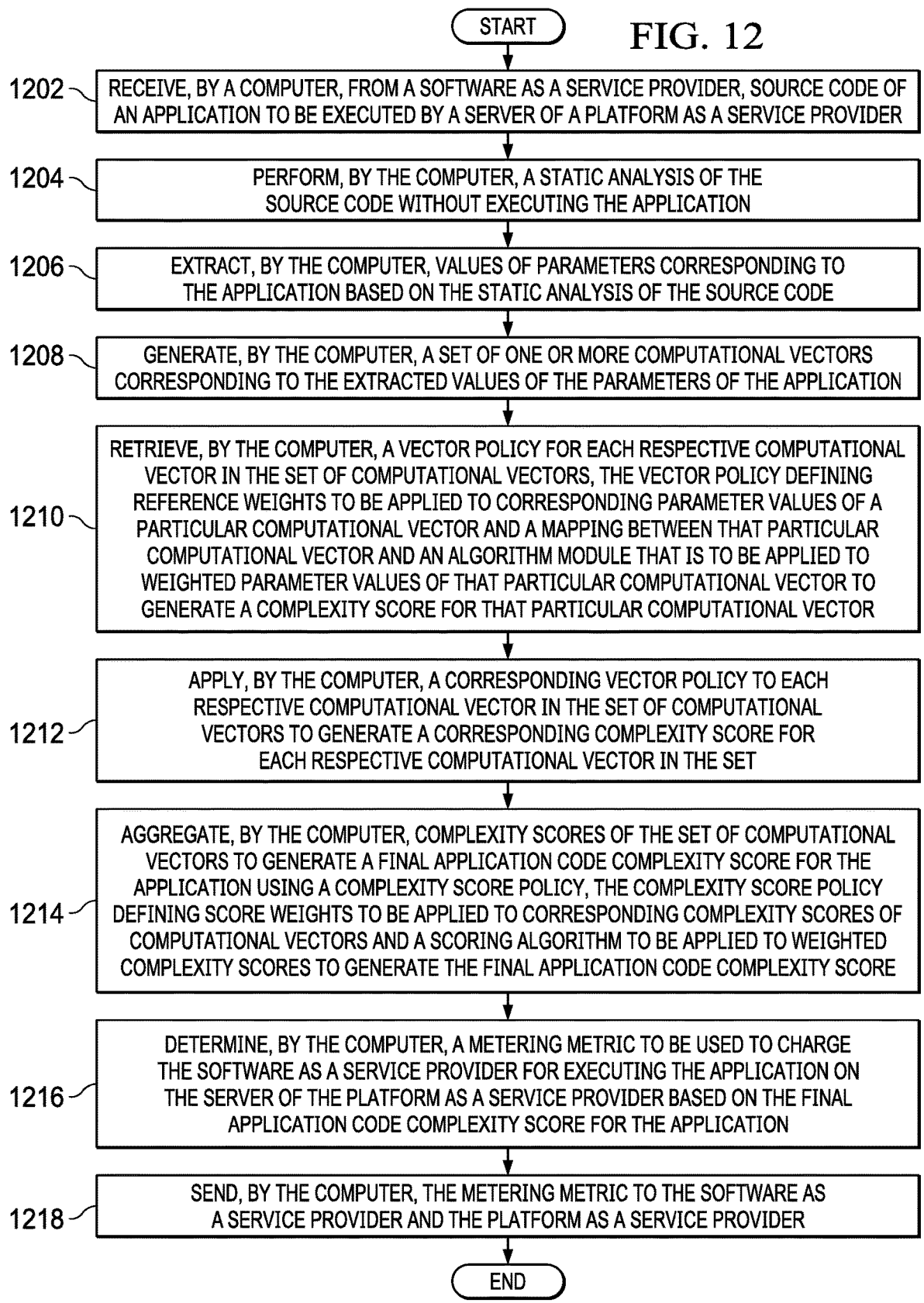

METERING BASED ON APPLICATION CODE COMPLEXITY

BACKGROUND

1. Field

The disclosure relates generally to cloud service metering and more specifically to determining a metering metric for a Software as a Service application that is to be executed on a Platform as a Service server based on complexity analysis of source code corresponding to the Software as a Service application.

2. Description of the Related Art

As Cloud computing matures and becomes more pervasive, adoption of Software as a Service and Platform as a Service applications is increasing. Projected characteristics that Software as a Service, Function as a Service, and other applications providers will look for in the future are, for example: 1) application code will be provided to Platform as a Service providers who execute or host the Software as a Service and other applications; 2) Software as a Service and other applications providers will be concerned with frequency and results of application code execution rather than underlying Infrastructure as a Service utilization; and 3) Software as a Service and other applications providers will increasingly be business users who prefer higher level pricing metrics over detailed infrastructure utilization metrics of various components, such as virtual machines, load balancers, network components, storage components, and the like.

From a Platform as a Service provider perspective, current metering mechanisms are not comprehensive enough. Current metering mechanisms are typically limited to resource utilization, such as number of application programming interface (API)/service calls, number of users, or amount of processor, memory, and storage utilization. As a result, a need exists for alternative cloud metering models for Software as a Service applications.

SUMMARY

According to one illustrative embodiment, a computer-implemented method for metering based on application code complexity is provided. A computer receives code of an application to be executed from a user. The computer extracts values of parameters corresponding to the application based on analysis of the code. The computer generates a set of computational vectors corresponding to extracted values of the parameters of the application to calculate a complexity of the code. The computer determines a metering metric to charge the user to execute the application based on the complexity of the code. The computer executes the application at the metering metric based on the complexity of the code. According to other illustrative embodiments, a computer system and computer program product for metering based on application code complexity are provided.

BRIEF DESCRIPTION OF THE DRAWINGS

FIG. 8 is a diagram illustrating an example of application code complexity computational vectors in accordance with an illustrative embodiment;

FIG. 12 is a flowchart illustrating a process for determining a metering metric for a Software as a Service application based on complexity of the Software as a Service application in accordance with an illustrative embodiment.

DETAILED DESCRIPTION

Figure 1:
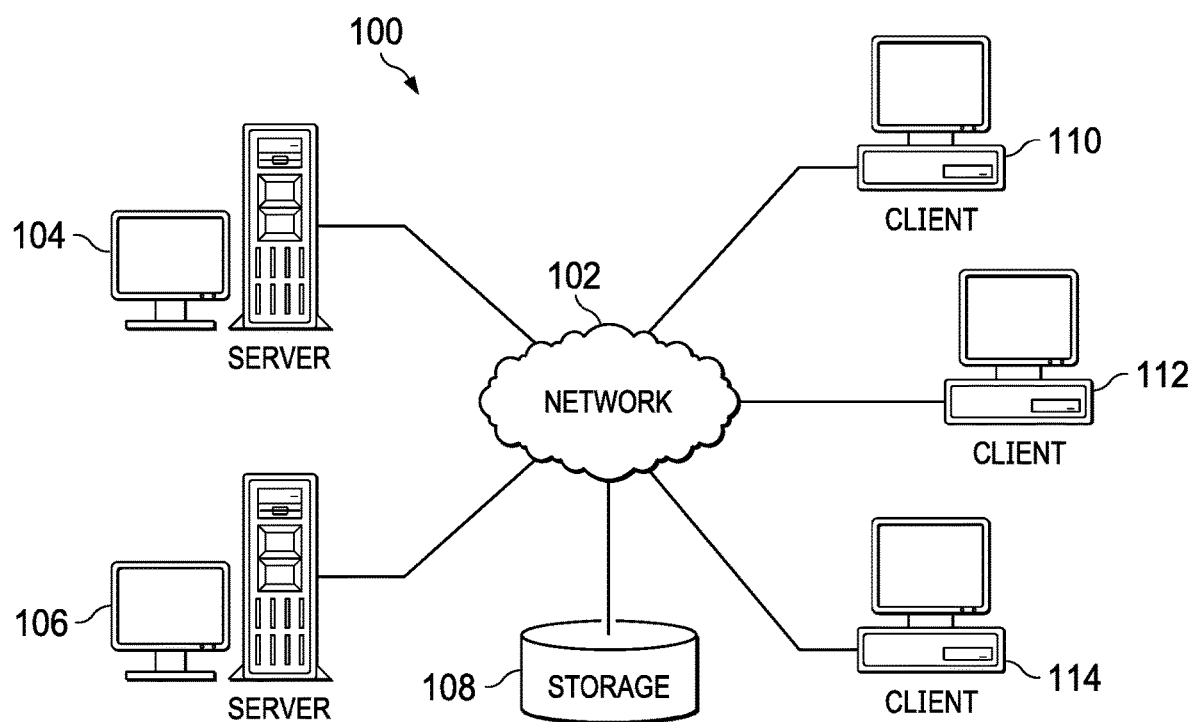
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-7, diagrams of data processing environments are provided in which illustrative embodiments may be implemented. It should be appreciated that FIGS. 1-7 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may correspond to a Platform as a Service provider. Server 104 and server 106 may execute applications corresponding to Software as a Service clients, Function as a Service clients, and other application clients. Further, server 104 and server 106 may provide application code complexity-based metering of services provided to these clients. Also, it should be noted that server 104 and server 106 may each represent nodes in a cloud computing environment. Alternatively, server 104 and server 106 may each represent a cluster of servers in a data center, for example.

Client 110, client 112, and client 114 also connect to network 102. Clients 110, 112, and 114 are clients of server 104 and/or server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart televisions, and the like, with wire or wireless communication links to network 102. Users of clients 110, 112, and 114, such as, for example, application owners or developers, may utilize clients 110, 112, and 114 to access and utilize the services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different servers, identifiers and network addresses for a plurality of different client devices, identifiers for a plurality of different users, and the like. Furthermore, storage unit 108 may store other types of data, such as authentication or credential data that may include user names, passwords, and biometric data associated with users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
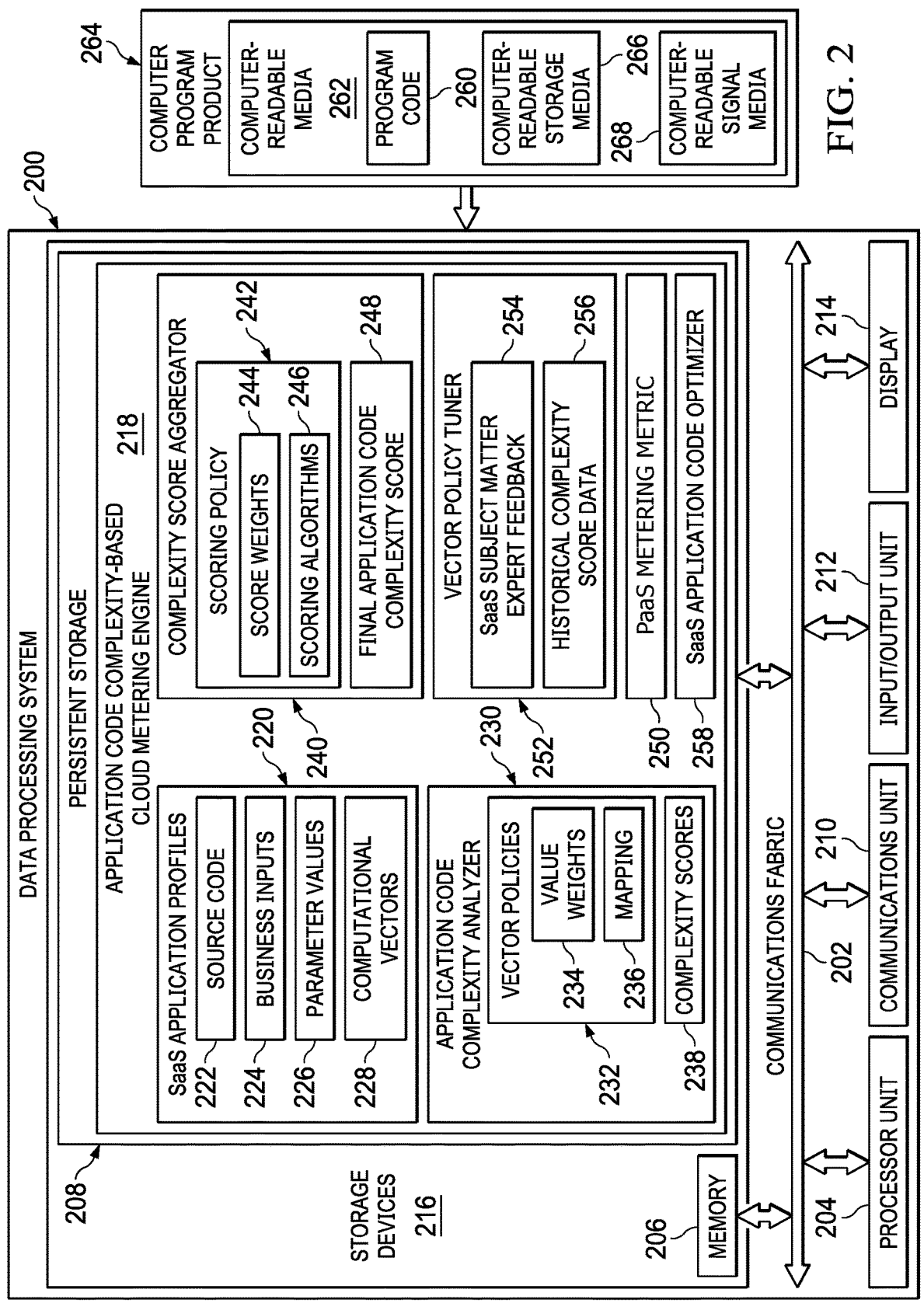
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores application code complexity-based cloud metering engine 218. However, it should be noted that even though application code complexity-based cloud metering engine 218 is illustrated as residing in persistent storage 208, in an alternative illustrative embodiment application code complexity-based cloud metering engine 218 may be a separate component of data processing system 200. For example, application code complexity-based cloud metering engine 218 may be a hardware component coupled to communication fabric 202 or a combination of hardware and software components. In another alternative illustrative embodiment, a first set of components of application code complexity-based cloud metering engine 218 may be located in data processing system 200 and a second set of components of application code complexity-based cloud metering engine 218 may be located in a second data processing system, such as, for example, server 106 in FIG. 1.

Application code complexity-based cloud metering engine 218 controls the process of determining a metering metric for a Software as a Service application that is to be executed on data processing system 200 based on an analysis of the complexity of the source code corresponding to the Software as a Service application. As a result, data processing system 200 operates as a special-purpose computer in which application code complexity-based cloud metering engine 218 resides, enabling source code complexity analysis of Software as a Service applications to determine a metering metric for each particular Software as a Service application. In particular, application code complexity-based cloud metering engine 218 transforms data processing system 200 into a special-purpose computer as compared to currently available general-purpose computers that do not have application code complexity-based cloud metering engine 218.

In this example, application code complexity-based cloud metering engine 218 includes Software as a Service application profiler 220. Application code complexity-based cloud metering engine 218 utilizes Software as a Service application profiler 220 to analyze source code 222 and business inputs 224 to extract parameter values 226 and generate computational vectors 228. Source code 222 represents the source code of a particular Software as a Service application. Business inputs 224 represent a set of factors that are important to a business entity that utilizes the Software as a Service application. Business inputs 224 may include, for example, application domain and environmental factors. Application domain is the area or field that the Software as a Service application is related to, such as education, banking, entertainment, insurance, medical, financial, and the like. Application environmental factors may include, for example, amount of compute resources, such as CPU, memory, and storage usage, that data processing system 200 needs to run the Software as a Service application. Parameter values 226 represent a set of values extracted from source code 222 and business inputs 224. Computational vectors 228 represent a set of vectors that Software as a Service application profiler 220 computes and generates based on parameter values 226 extracted from source code 222.

Application code complexity-based cloud metering engine 218 also includes application code complexity analyzer 230. Application code complexity-based cloud metering engine 218 utilizes application code complexity analyzer 230 to apply vector policies 232 to computational vectors 228 to generate complexity scores 238. Vector policies 232 represent a set of one or more vector policies, each vector policy in the set corresponds to a particular computational vector in computational vectors 228 and includes value weights 234 and mapping 236. Value weights 234 represent a set of one or more weights that correspond to particular parameter values in parameter values 226. In other words, application code complexity analyzer 230 adjusts the value of corresponding parameter values in parameter values 226 using value weights 234. Mapping 236 maps each particular computational vector in computational vectors 228 to a particular algorithm module. Application code complexity analyzer 230 utilizes the algorithm modules to generate a complexity score for each particular computational vector in computational vectors 228.

Application code complexity-based cloud metering engine 218 also includes complexity score aggregator 240. Application code complexity-based cloud metering engine 218 utilizes complexity score aggregator 240 to apply scoring policy 244 to complexity scores 238 to generate final application code complexity score 248. Scoring policy 242 corresponds to the Software as a Service application associated with source code 222 and includes score weights 244 and scoring algorithm 246. Score weights 244 represent a set of one or more weights that correspond to particular complexity scores in complexity scores 238. In other words, complexity score aggregator 240 adjusts the score of each corresponding complexity score in complexity scores 238 using score weights 244. Complexity score aggregator 240 utilizes scoring algorithm 246 to generate final application code complexity score 248 based on the weighted complexity scores for each computational vector in computational vectors 228. Final application code complexity score 248 represents an aggregated complexity score for the Software as a Service application associated with source code 222.

Application code complexity-based cloud metering engine 218 utilizes final application code complexity score 248 to generate Platform as a Service metering metric 250. Platform as a Service metering metric 250 represents the service price that data processing system 200 charges the Software as a Service provider for executing the Software as a Service application associated with source code 222.

Application code complexity-based cloud metering engine 218 utilizes vector policy tuner 252 to update, modify, or optimize computational vectors 228 and vector policies 232 based on Software as a Service subject matter expert feedback 254 and historical complexity score data 256. Software as a Service subject matter expert feedback 254 represents feedback regarding final application code complexity score 248 from a set of one or more subject matter experts corresponding to the Software as a Service application associated with source code 222. Historical complexity score data 256 represents previously stored complexity scores corresponding to the Software as a Service application associated with source code 222 or other similar Software as a Service applications.

Application code complexity-based cloud metering engine 218 utilizes Software as a Service application code optimizer 258 to automatically optimize or enhance source code 222 by decreasing the complexity of the Software as a Service application based on cognitive analysis of final application code complexity score 248 and Software as a Service subject matter expert feedback 254. By decreasing the complexity of the Software as a Service application running on data processing system 200, illustrative embodiments increase performance of data processing system 200 by decreasing usage of compute resources needed to execute the Software as a Service application. In addition, by decreasing the amount of compute resource usage on data processing system 200, illustrative embodiments decrease the cost of executing the Software as a Service application.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 260 is located in a functional form on computer readable media 262 that is selectively removable and may be loaded onto or transferred to data processing system 200 for running by processor unit 204. Program code 260 and computer readable media 262 form computer program product 264. In one example, computer readable media 262 may be computer readable storage media 266 or computer readable signal media 268. Computer readable storage media 266 may include, for example, an optical or magnetic disc that is inserted or placed into a drive or other device that is part of persistent storage 208 for transfer onto a storage device, such as a hard drive, that is part of persistent storage 208. Computer readable storage media 266 also may take the form of a persistent storage, such as a hard drive, a thumb drive, or a flash memory that is connected to data processing system 200. In some instances, computer readable storage media 266 may not be removable from data processing system 200.

Alternatively, program code 260 may be transferred to data processing system 200 using computer readable signal media 268. Computer readable signal media 268 may be, for example, a propagated data signal containing program code 260. For example, computer readable signal media 268 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 260 may be downloaded over a network to persistent storage 208 from another device or data processing system through computer readable signal media 268 for use within data processing system 200. For instance, program code stored in a computer readable storage media in a data processing system may be downloaded over a network from the data processing system to data processing system 200. The data processing system providing program code 260 may be a server computer, a client computer, or some other device capable of storing and transmitting program code 260.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 266 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), Infrastructure as a Service (IaaS), and Function as a Service (FaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls. Function as a Service allows consumer to develop, run, and manage application functionalities without the complexity of building and maintaining the infrastructure typically associated with developing and launching an application. Building an application following this model is one way of achieving a serverless architecture and is typically used when building microservice applications. In this model, allocation of resources is managed by the cloud provider instead of the application developer.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
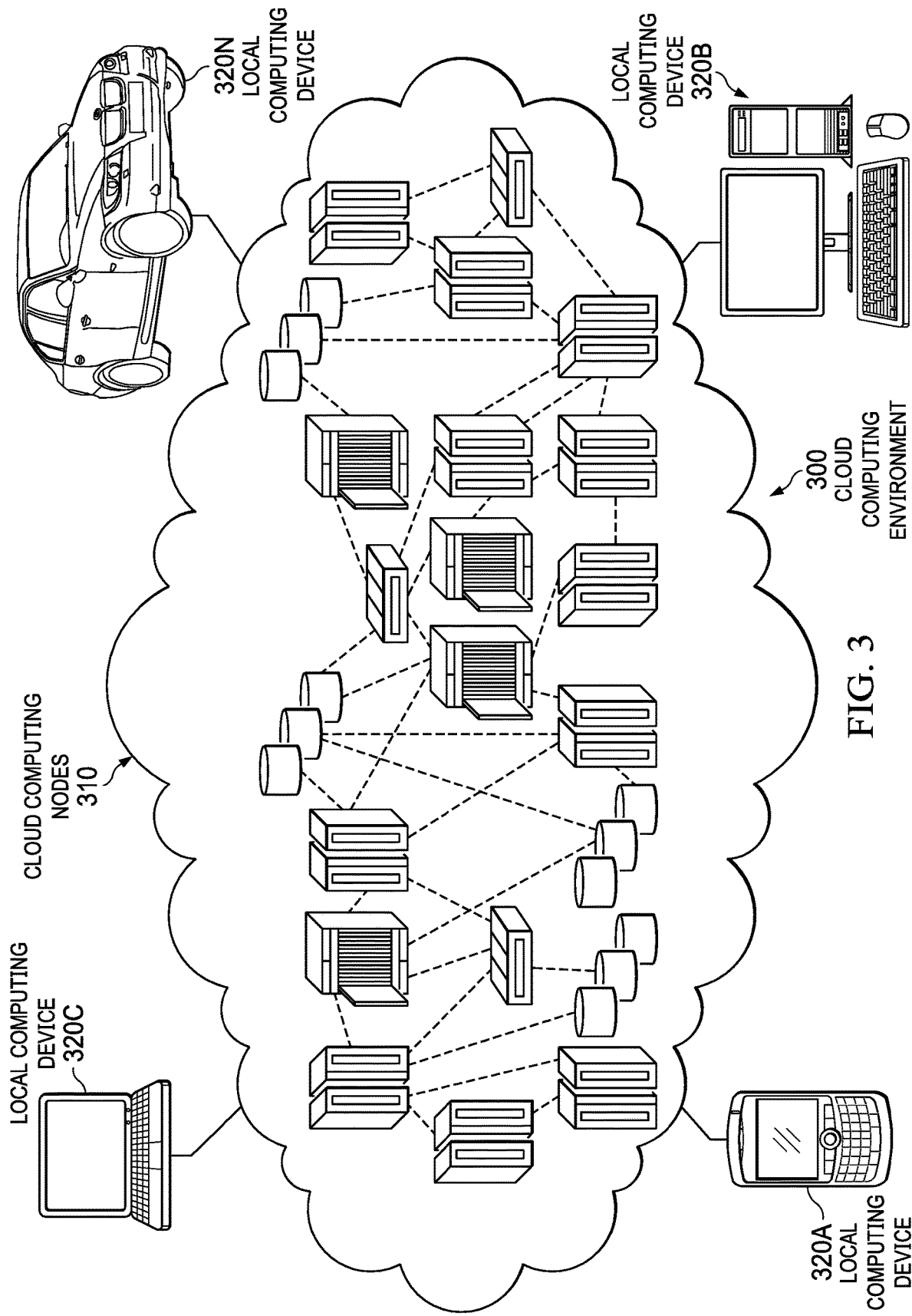
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
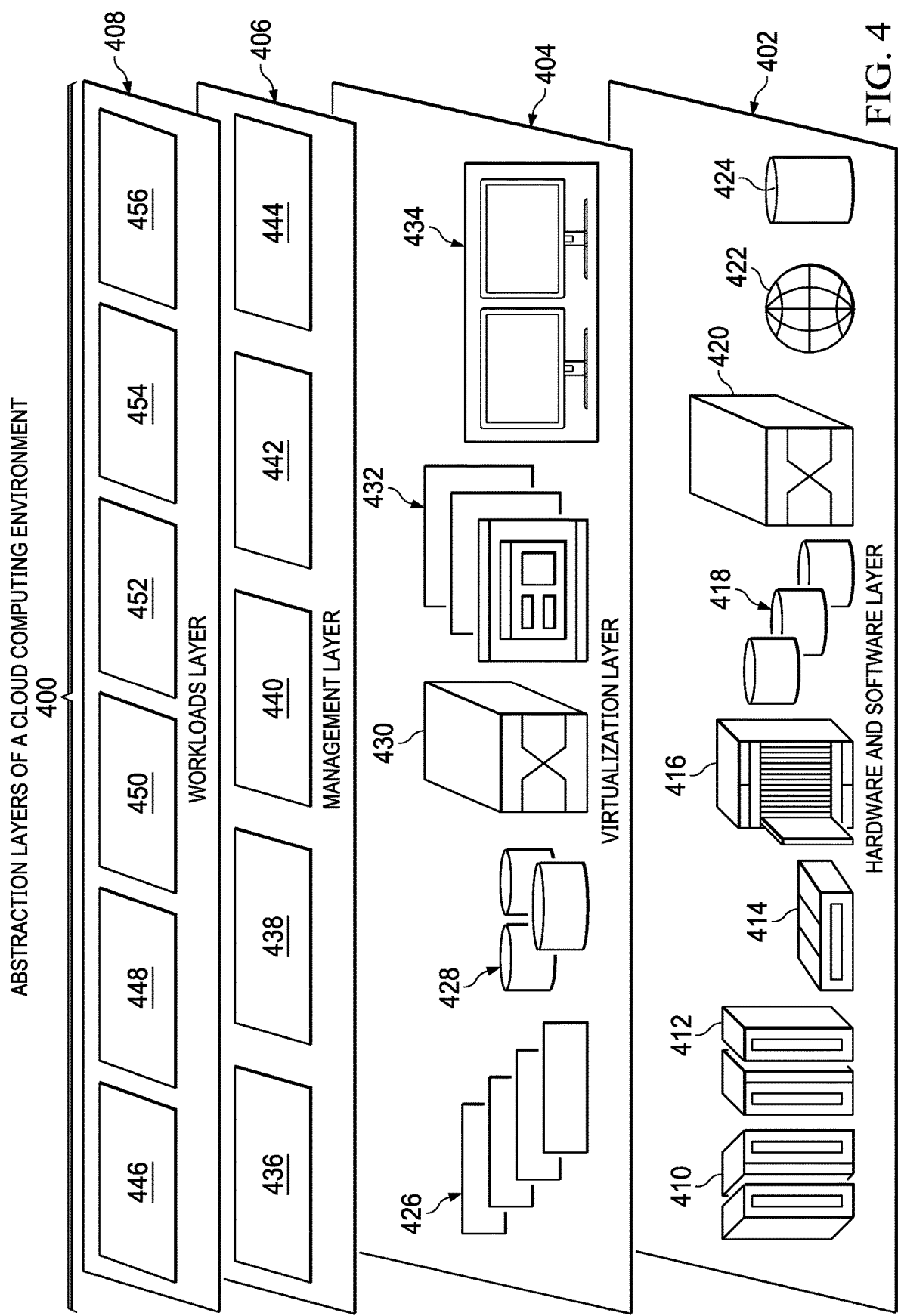
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and application code complexity-based cloud metering 456.

Software complexity is a natural byproduct of the functional complexity that the source code is attempting to enable. Software complexity encompasses the numerous parameters or properties of the source code, all of which affect interactions of the software. In other words, software complexity takes into account interactions of the source code. As the number of interactions increases, the degree of software complexity increases.

Illustrative embodiments utilize application code complexity as a metric to provide abstracted metering or billing for SaaS applications. PaaS providers who utilize illustrative embodiments will receive an application code complexity score, which the PaaS providers can use in addition to other factors, such as IaaS downstream costs, to bill upstream SaaS or other applications providers.

Current downstream IaaS metering is based on infrastructure allocation and utilization metrics. Further, current PaaS services are metered by, for example, number of API invocations, database size, number of transactions, and the like. However, PaaS providers currently do not consider application code complexity metrics for SaaS application metering. Illustrative embodiments comprise an application code complexity-based metering engine at the PaaS level, which PaaS providers will use as an additional or alternative cloud metering mechanism for services provided to SaaS applications.

As an example scenario, assume a PaaS, such as a compiler as a service. An end user, such as, for example, an application owner, provides application source code to a PaaS provider for execution. The PaaS provider utilizes illustrative embodiments to analyze the application source code in order to understand the complexity of the application source code. The PaaS provider then uses the output of illustrative embodiments (i.e., the application code complexity score) as one of the parameters to determine the service price to be charged to the application owner.

Illustrative embodiments calculate the application code complexity score of a given SaaS application by taking into account a plurality of different factors, such as code complexity, environment complexity, application domain, application skill complexity, and the like, in addition to current downstream costs, such as IaaS costs. Thus, illustrative embodiments enable PaaS providers to bill customers, such as SaaS providers, based on the complexity of the SaaS application being executed by a computer of the PaaS provider. This includes application code complexity, along with other domain specific complexity factors, such as regulatory compliance factors, data security factors, and the like, which correspond to a particular data domain. The PaaS provider abstracts downstream IaaS costs and uses the calculated application code complexity score to provide a consolidated upstream cost to the SaaS provider. Furthermore, illustrative embodiments generate a pricing estimate (i.e., metering metric) without actually deploying and running the SaaS application (i.e., not performing a runtime analysis of the SaaS application, which would require an increased number of computer resources). In other words, illustrative embodiments perform a static analysis of the SaaS application, unlike current metering mechanisms. Thus, illustrative embodiments increase PaaS computer performance by decreasing the utilization of computer resources, such as processors, processor cycles, memory, storage, and the like, during analysis of the SaaS application to calculate the application code complexity score.

It should be noted that the application code complexity-based cloud metering engine of illustrative embodiments may be implemented in isolation (i.e., by itself) as the only cloud metering service or may be augmented with other existing cloud metering services, such as IaaS metering. Additionally, when an end-to-end application consumes multiple SaaS or FaaS services, the application metering can consider a combination of metering services, of which, application code complexity-based metering is one. In other words, the total application metering is a factor of each individual metering service.

Illustrative embodiments utilize a plurality of different components, such as a SaaS application profiler, an application code complexity analyzer, a complexity policy tuner, and the like, to calculate the application complexity code score of a SaaS application. The SaaS application profiler extracts information associated with the SaaS application to generate computational vectors required by the application code complexity analyzer. It should be noted that the SaaS application provider does not provide the computational vectors, but are instead generated by the SaaS application profiler of illustrative embodiments. A computational vector is a set of one or more corresponding parameters derived from the SaaS application code and business inputs, which illustrative embodiments utilize in determining the code complexity of the SaaS application. As an example, computational vector "C1" is an application variables computational vector having parameters, such as number of input variables, number of output variables, size of the data, and the like. Each parameter has a value that influences the code complexity score of the SaaS application. Source code and other manual user inputs, such as business and environmental inputs, act as inputs to the SaaS application profiler.

The output of the SaaS application profiler is values corresponding to the different parameters, such as number of lines in the application code, number of loops, number of arithmetic logic unit instructions, number of machine instructions, application performance requirements, application skill requirements, application peak usage requirements, and the like. Illustrative embodiments utilize these values to generate the computational vectors required by different compute engines and vector policies.

The application code complexity analyzer also includes a plurality of components, such as a vector policy database, algorithm modules, compute engines, and an application code complexity score aggregator. The vector policy database contains all the metadata corresponding to each compute engine, such as vector parameter value weights, variables considered, and algorithm modules to be applied, which are input by one or more SaaS subject matter experts. A vector policy includes an identifier of a particular computational vector on which the vector policy is to be applied, a set of reference weights (i.e., vector parameter value weights) that are to be applied to each corresponding parameter value of that particular computational vector, and an identifier of a particular algorithm module that is to be applied to the weighted parameter values of that particular computational vector to generate a complexity score for that particular computational vector. An algorithm module contains a set of one or more algorithms required to compute a code complexity score for a particular corresponding computational vector. A SaaS subject matter expert can add any number of algorithm modules to the application code complexity analyzer. A compute engine is the component that computes the application code complexity score, which includes, for example, application code complexity, environmental complexity, application domain, application skill complexity, resource availability complexity, and the like, for a particular computational vector using a compute policy. The application code complexity score aggregator receives the different application code complexity scores of the different computational vectors generated by the different compute engines and calculates a final application code complexity score based on aggregating the application code complexity scores received from the different compute engines using a scoring policy.

The complexity policy tuner receives feedback from a set of one or more corresponding SaaS subject matter experts regarding the final application code complexity score for the SaaS application. The complexity policy tuner also receives a deviation factor corresponding to the final application code complexity score and feeds the deviation factor into the vector policy database to retune the vector parameter value weights based on an average of the deviation factor, for example. The deviation factor is the gap between an expected result and an actual result, such as a 10%, 20%, or any other percentage of deviation. Illustrative embodiments generate the average deviation factor based on inputs received from all of the SaaS application providers and subject matter experts. The complexity policy tuner also sends feedback to the SaaS application profiler to add and delete parameters of a computational vector. Further, the complexity policy tuner, itself, may add and delete computational vectors. Furthermore, the complexity policy tuner may provide cognitive insights into changing or selecting the appropriate algorithm as well.

A billing generator takes the final application code complexity score as input from the application complexity code analyzer. The final application code complexity score is a value to be charged to the SaaS application provider in addition to the IaaS costs. The billing generator converts the final application complexity code score into a service price (i.e., metering metric), which the PaaS provider uses for billing the SaaS or FaaS provider. Further, the billing generator can optionally use other metering services as well to compute the final charging to the SaaS or FaaS provider.

As an example application code complexity analysis process, the output of the SaaS application profiler component may include, for example, application variables computational vector C1, which comprises parameters, such as number of input variable types equal to 5, number of output variable types equal to 8, and number of variables equal to 20, and code execution controls computational vector C2, which comprises parameters, such as number of branches equal to 8, number of loops equal to 5, and number of recursive methods equal to 3. The SaaS application profiler extracts these associated values for each parameter of the computational vectors from the SaaS application information.

The output of the vector policy database may be, for example, vector policy 1, which corresponds to application variables computational vector C1, and vector policy 2, which corresponds to code execution controls computational vector C2. Vector policy 1 indicates that illustrative embodiments are to apply reference weights of 1, 0.7, and 0.3 to the values of the three parameters (i.e., number of input variable types, number of output variable types, and number of variables) of application variables computational vector C1 and to apply algorithm module 1 for generating an application complexity score corresponding to application variables computational vector C1. Vector policy 2 indicates that illustrative embodiments are to apply reference weights of 0.5, 0.6, and 0.8 to the values of the three parameters (i.e., number of branches, number of loops, and number of recursive methods) of code execution controls computational vector C2 and to apply algorithm module 2 for generating an application complexity score corresponding to code execution controls computational vector C2.

In other words, the vector policy database stores a defined policy for each particular computational vector. The defined policy includes reference weights for values of each respective parameter of a particular computational vector. The defined policy also specifies the algorithm module that illustrative embodiments are to apply to calculate the application code complexity score for that particular computational vector.

In this example, algorithm module 1 calculates an average value and algorithm module 2 takes a maximum value. However, it should be noted that illustrative embodiments may utilize any number and type of algorithm modules. In other words, the algorithm modules may contain different algorithms for calculating an application code complexity score for a particular computational vector. Moreover, the defined policy maps that particular computational vector to the appropriate algorithm module.

In this example, compute engine C1 calculates an application code complexity score for application variables computational vector C1 by multiplying 5*1, 8*0.7, and 20*0.3 (where 5, 8, and 20 are the parameter values of computational vector C1 and 1, 0.7, and 0.3 are the reference weights defined in vector policy 1), which equals 5, 5.6, and 6, respectively. Then, compute engine C1 applies algorithm module 1, which also is defined by vector policy 1, to compute an average application code complexity score of 5.53 for computational vector C1. In addition, compute engine C2 calculates an application code complexity score for code execution controls computational vector C2 by multiplying 8*0.5, 5*0.6, and 3*0.8 (where 8, 5, and 3 are the parameter values of computational vector C3 and 0.5, 0.6, and 0.8 are the reference weights defined in vector policy 2), which equals 4, 3, and 2.4, respectively. Then, compute engine C2 applies algorithm module 2, which also is defined by vector policy 2, to compute a maximum application code complexity score of 4 for computational vector C2. However, it should be noted that illustrative embodiments may apply any type of algorithm, such as a simple or complex algorithm (e.g., Cyclomatic Complexity). For illustrative purposes, simple algorithms were used in the example above.

Afterward, illustrative embodiments utilize the application code complexity score aggregator to generate a final or aggregate application code complexity score. In this example, the application code complexity score aggregator calculates an average final score of 4.77. In other words, the application code complexity score aggregator adds 5.53 (i.e., the complexity score for computational vector C1) and 4 (i.e., the complexity score for computational vector C2) and divides that sum (i.e., 9.53) by 2 to get the final application code complexity score of 4.77. However, it should be noted that the application code complexity score aggregator may utilize any type of algorithm to calculate the final score.

Moreover, it should be noted that prior art solutions compute application code complexity after execution of a SaaS application in batch mode. However, illustrative embodiments analyze the SaaS application and compute the code complexity without executing the SaaS application. Illustrative embodiments perform this SaaS application analysis once per release, which is unlike current solutions that perform this after each execution. In addition, illustrative embodiments utilize a static code profiler-based process to generate the computational vectors. In other words, illustrative embodiments generate these computational vectors statically, without running the application code. Illustrative embodiments then map the computational vectors to algorithm modules to calculate an application code complexity score for each respective computational vector. Current solutions do not use static analysis.

Figure 5:
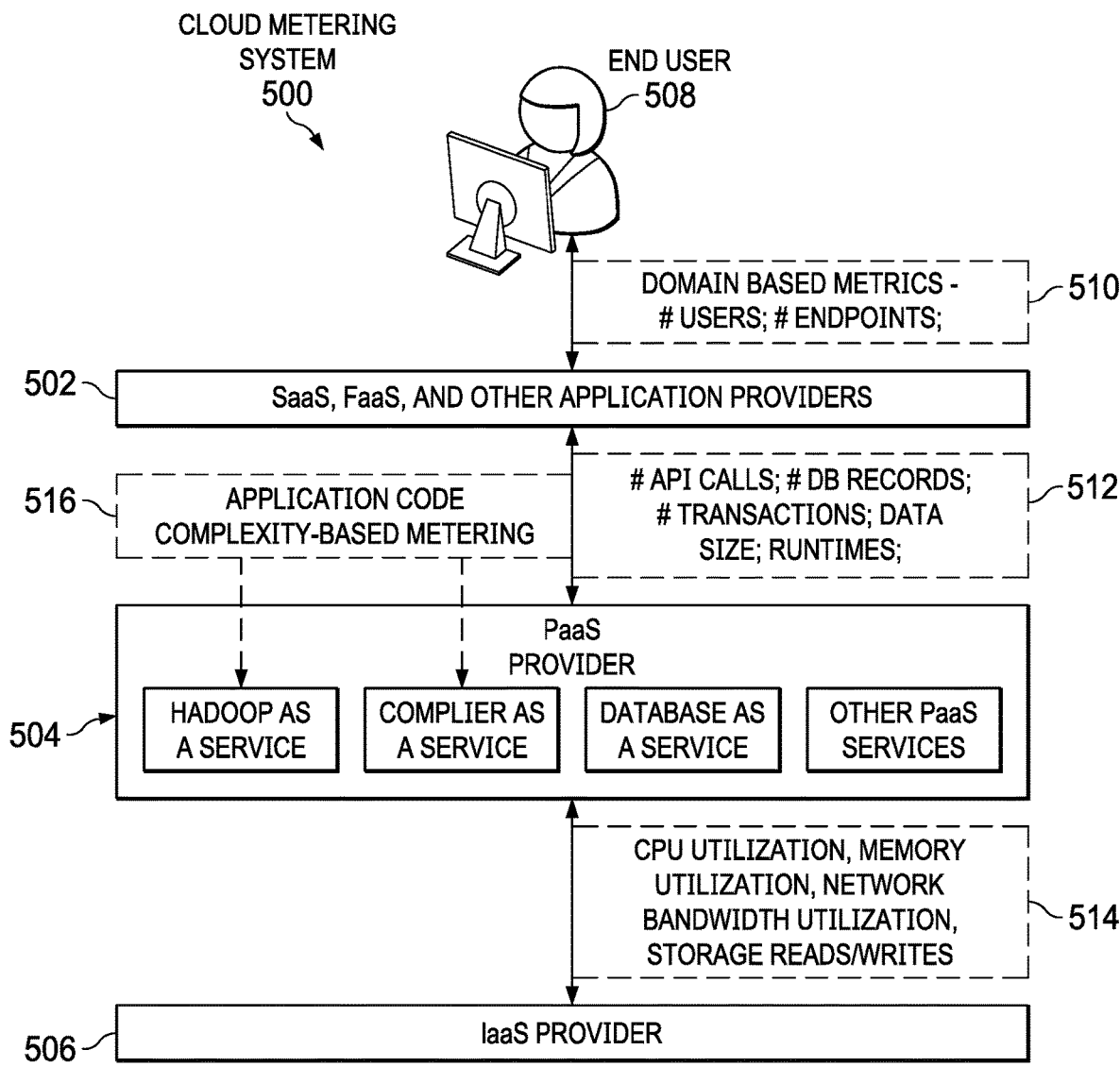
FIG. 5 is a diagram illustrating an example of a cloud metering system in accordance with an illustrative embodiment.

With reference now to FIG. 5, a diagram illustrating an example of a cloud metering system is depicted in accordance with an illustrative embodiment. Cloud metering system 500 may be implemented in a network of data processing systems, such as network data processing system 100 in FIG. 1, or a cloud computing environment, such as cloud computing environment 300 in FIG. 3. Cloud metering system 500 is a system of hardware and software components for determining a metering metric for a SaaS application that is to be executed on a PaaS server based on complexity of the source code corresponding to the SaaS application.

In this example, cloud metering system 500 includes SaaS, FaaS, and other application providers 502, PaaS provider 504, IaaS provider 506, and end user 508. End user 508 may be, for example, an application owner or developer. End user 508 typically provides domain-based metering metrics 510, which in this example include number of users and number of endpoints. PaaS provider 504 typically provides PaaS metering metrics 512, which in this example include number of API calls, number of database records, number of transactions, data size, and run times. IaaS provider 506 typically provides IaaS metering metrics 514, which in this example include CPU utilization, memory utilization, network bandwidth utilization, and storage reads/writes. However, it should be noted that PaaS provider 504 using illustrative embodiments also provides application code complexity-based metering metrics 516.

Figure 6:
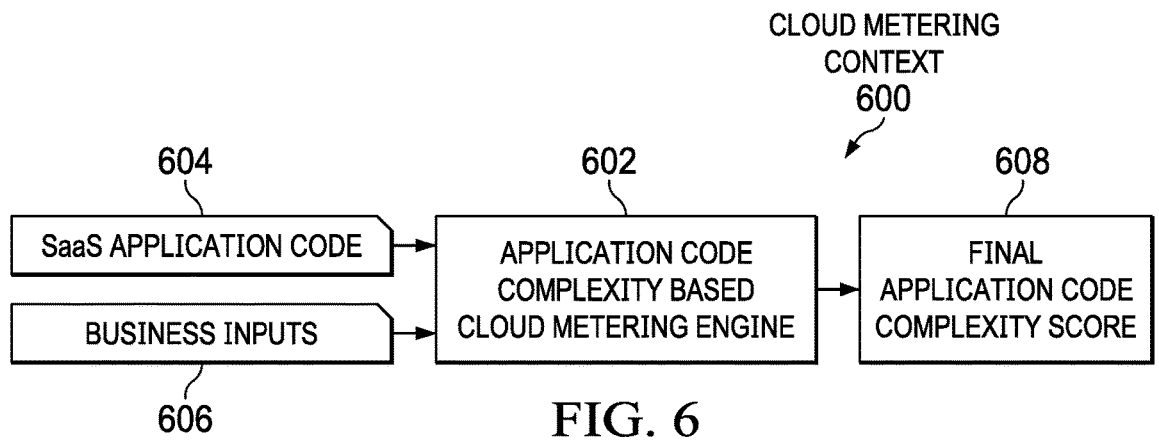
FIG. 6 is a diagram illustrating an example of cloud metering context in accordance with an illustrative embodiment.

With reference now to FIG. 6, a diagram illustrating an example of cloud metering context is depicted in accordance with an illustrative embodiment. Cloud metering context 600 shows application code complexity-based cloud metering engine 602, SaaS application code 604, business inputs 606, and final application code complexity score 608. Application code complexity-based cloud metering engine 602, SaaS application code 604, business inputs 606, and final application code complexity score 608 may be, for example, application code complexity-based cloud metering engine 218, source code 222, business inputs 224, and final application code complexity score 248 in FIG. 2. Application code complexity-based cloud metering engine 602 receives as input SaaS application code 604 and business inputs 606 to generate final application code complexity score 608.

Figure 7:
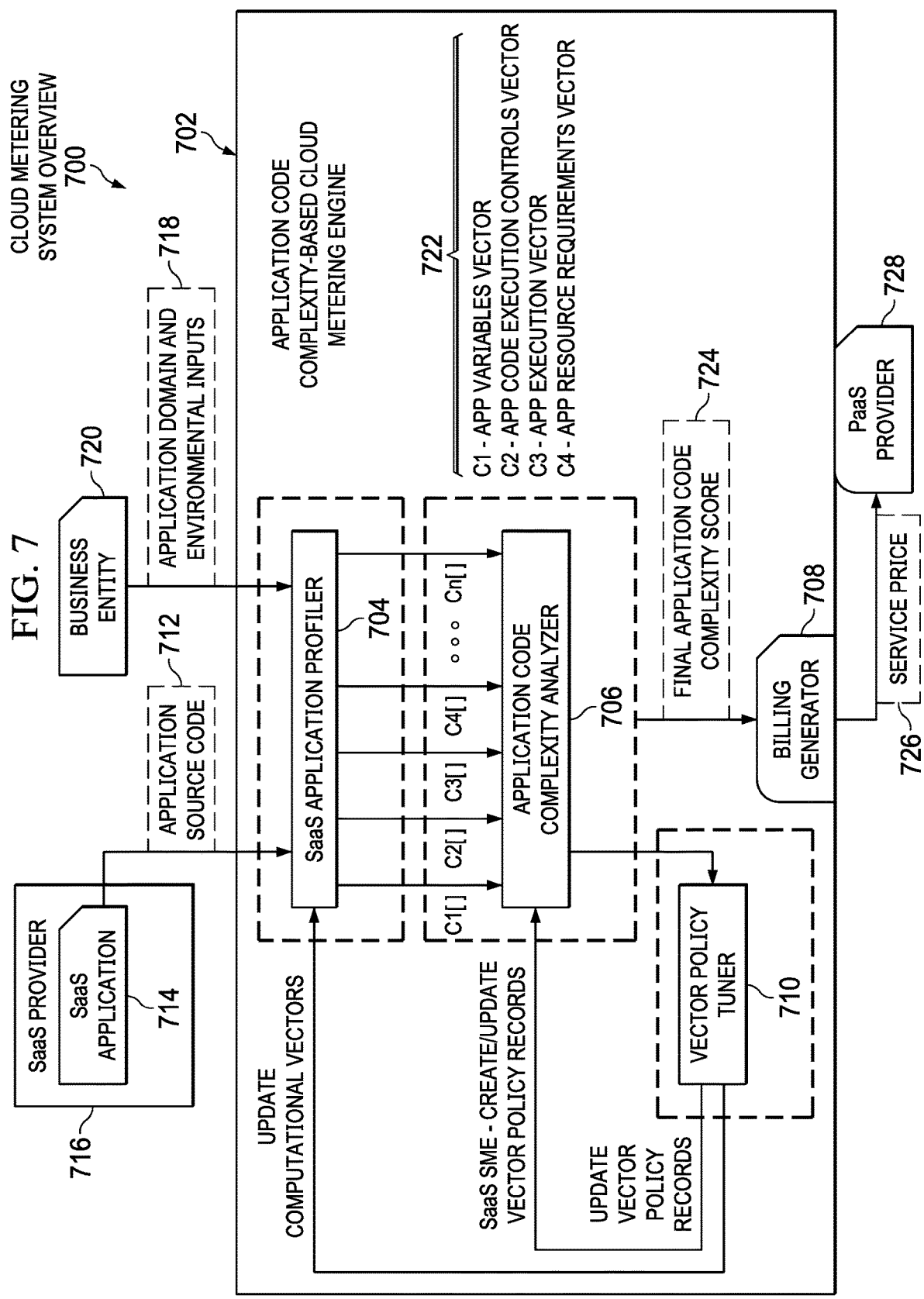
FIG. 7 is a diagram illustrating an example of a cloud metering system overview in accordance with an illustrative embodiment.

With reference now to FIG. 7, a diagram illustrating an example of a cloud metering system overview is depicted in accordance with an illustrative embodiment. Cloud metering system overview 700 illustrates a high-level functional view of application code complexity-based cloud metering engine 702. Application code complexity-based cloud metering engine 702 may be, for example, application code complexity-based cloud metering engine 218 in FIG. 2.

In this example, application code complexity-based cloud metering engine 702 includes SaaS application profiler 704, application code complexity analyzer 706, billing generator 708, and vector policy tuner 710. SaaS application profiler 704 receives as input application source code 712 of SaaS application 714 from SaaS provider 716. In addition, SaaS application profiler 704 receives application domain and environmental inputs 718 from business entity 720. SaaS application profiler 704 extracts parameter values from application source code 712.

SaaS application profiler 704 uses the extracted parameter values from application source code 712 and application domain and environmental inputs 718 to generate computational vectors 722. In this example, computational vectors 722 include C1 application variables vector, C2 application code execution controls vector, C3 application execution vector, and C4 application resource requirements vector. SaaS application profiler 704 outputs generated computational vectors 722 to application code complexity analyzer 706.

Application code complexity analyzer 706 weights the parameter values of computational vectors 722 and applies a corresponding algorithm module to each computational vector to generate a complexity score for each respective computational vector in computational vectors 722. Then, application code complexity analyzer 706 aggregates the complexity scores of the computational vectors to generate final application code complexity score 724. Application code complexity analyzer 706 outputs final application code complexity score 724 to billing generator 708. Billing generator 708 generates service price 726 based on final application code complexity score 724. Service price 726 is a metering metric that corresponds to SaaS application 714. Billing generator 708 outputs service price 726 to PaaS provider 728. PaaS provider 728 will execute SaaS application 714 for SaaS provider 716. PaaS provider 728 bills SaaS provider 716 for execution of SaaS application 714 based on service price 726.

Application code complexity analyzer 706 also outputs final application code complexity score 724 to vector policy tuner 710. Vector policy tuner 710 uses information regarding final application code complexity score 724 to update vector policies in application code complexity analyzer 706 and update computational vectors in SaaS application profiler 704. In addition, vector policy tuner 710 also provides recommendations for changing the algorithm. Further, it should be noted that a SaaS subject matter expert may create and update vector policies in application code complexity analyzer 706.

With reference now to FIG. 8, a diagram illustrating an example of application code complexity computational vectors is depicted in accordance with an illustrative embodiment. Application code complexity computational vectors 800 represent different computational vectors that correspond to extracted source code parameters of a particular SaaS application under analysis. Application code complexity computational vectors 800 may be, for example, application code complexity computational vectors 722 in FIG. 7. However, it should be noted that application code complexity computational vectors 800 are intended as examples only and not as limitations on illustrative embodiments. In other words, application code complexity computational vectors 800 may include any number and type of computational vectors. Further, each computational vector may include any number and type of parameters.

In this example, application code complexity computational vectors 800 include C1 application variables vector 802, C2 application code execution controls vector 804, C3 application execution vector 806, and C4 application resource requirements vector 808. C1 application variables vector 802 includes parameters number of input variables, number of output variables, type of variables, number of variables, type of data, size of data, and accuracy of data. C2 application code execution controls vector 804 includes parameters number of branches, number of loops, number of recursive methods, number of execution paths, degree of parallelism, number of arithmetic logic unit instructions, number of methods, number of lines, interpreted/compiled code, and number of SaaS/PaaS APIs invoked. C3 application execution vector 806 includes duration of execution, session-based execution, and application permissions. C4 application resource requirements vector 808 includes parameters minimum resources required, number of memory blocks allocated, integration with other applications, number of libraries/packages used, code execution time (peak vs. non-peak times), complexity of environment needed to execute the code, and skills and technology required by the code.

Figure 9:
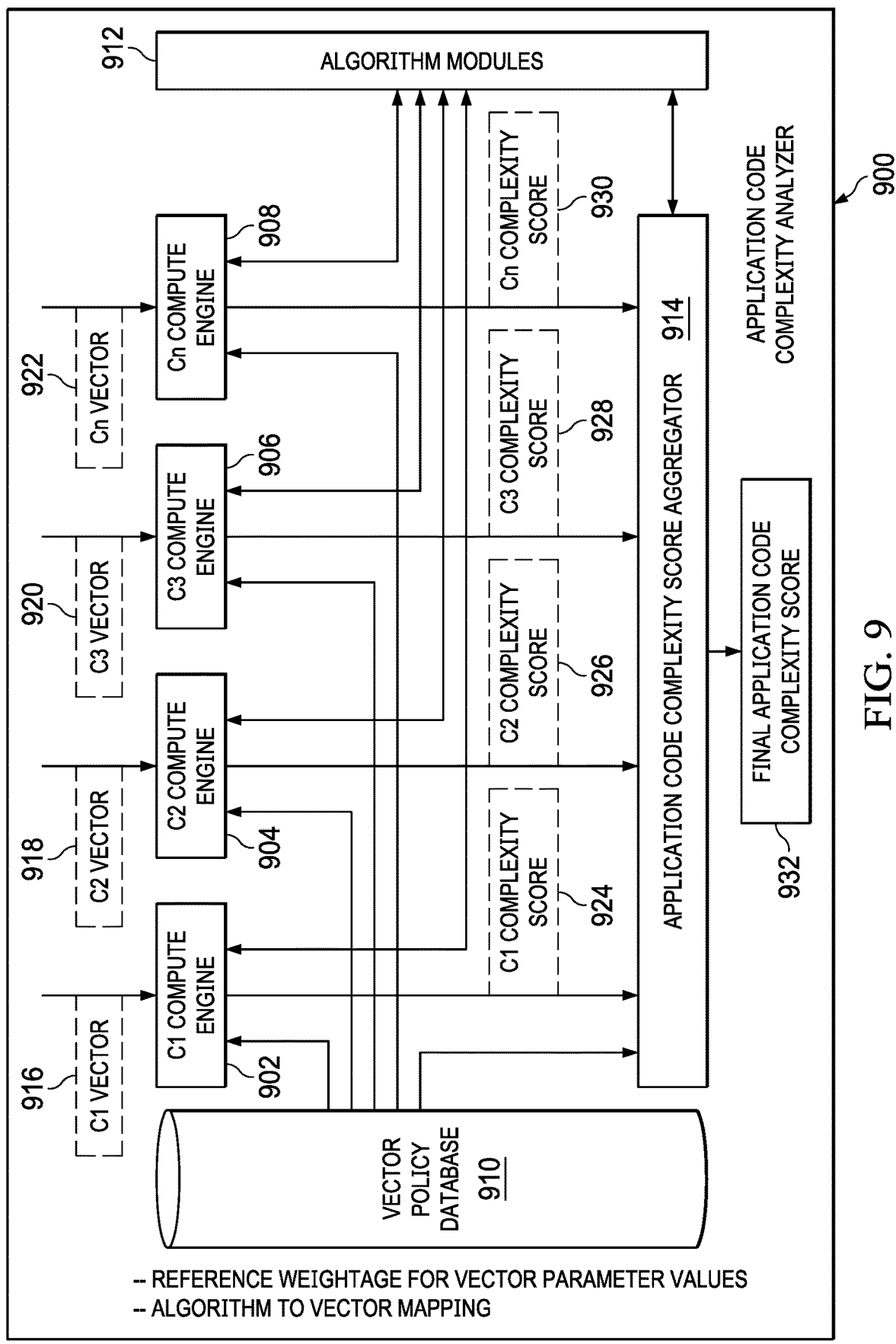
FIG. 9 is a diagram illustrating an example of an application code complexity analyzer in accordance with an illustrative embodiment.

With reference now to FIG. 9, a diagram illustrating an example of an application code complexity analyzer is depicted in accordance with an illustrative embodiment. Application code complexity analyzer 900 evaluates a set of one or more computational vectors corresponding to parameter values of SaaS application source code to generate a complexity score for the SaaS application. Application code complexity analyzer 900 may be, for example, application code complexity analyzer 706 in FIG. 7.

In this example, application code complexity analyzer 900 includes C1 compute engine 902, C2 compute engine 904, C3 compute engine 906, Cn compute engine 908, vector policy database 910, algorithm modules 912, and application code complexity score aggregator 914. Vector policy database 910 stores a plurality of different vector policies, each vector policy corresponds to a different computational vector. A vector policy includes an identification of the computational vector on which the vector policy is to be applied, a set of reference weights to apply to parameter values of the computational vector, and a mapping between that computational vector and a corresponding algorithm module in algorithm modules 912 to be applied to the weighted parameter values. Algorithm modules 912 represent a plurality of different algorithm modules, which correspond to the different computational vectors.

In this example, C1 compute engine 902, C2 compute engine 904, C3 compute engine 906, and Cn compute engine 908 receive as input C1 computational vector 916, C2 computational vector 918, C3 computational vector 920, and Cn computational vector 922, respectively. C1 compute engine 902, C2 compute engine 904, C3 compute engine 906, and Cn compute engine 908 extract the parameter values of C1 computational vector 916, C2 computational vector 918, C3 computational vector 920, and Cn computational vector 922, respectively. In addition, each of C1 compute engine 902, C2 compute engine 904, C3 compute engine 906, and Cn compute engine 908 retrieve a vector policy that corresponds to C1 computational vector 916, C2 computational vector 918, C3 computational vector 920, and Cn computational vector 922, respectively.

Then, C1 compute engine 902, C2 compute engine 904, C3 compute engine 906, and Cn compute engine 908 apply the reference weights of the retrieved vector policy corresponding to the extracted parameter values of C1 computational vector 916, C2 computational vector 918, C3 computational vector 920, and Cn computational vector 922, respectively. Further, C1 compute engine 902, C2 compute engine 904, C3 compute engine 906, and Cn compute engine 908 apply the algorithm module identified in the retrieved vector policy to the weighted parameter values corresponding to C1 computational vector 916, C2 computational vector 918, C3 computational vector 920, and Cn computational vector 922, respectively. After applying the algorithm module to the corresponding weighted parameter values of the computational vectors, C1 compute engine 902, C2 compute engine 904, C3 compute engine 906, and Cn compute engine 908 generate C1 complexity score 924, C2 complexity score 926, C3 complexity score 928, and Cn complexity score 930, respectively.

C1 compute engine 902, C2 compute engine 904, C3 compute engine 906, and Cn compute engine 908 input C1 complexity score 924, C2 complexity score 926, C3 complexity score 928, and Cn complexity score 930 into application code complexity score aggregator 914. Application code complexity score aggregator 914 aggregates or combines C1 complexity score 924, C2 complexity score 926, C3 complexity score 928, and Cn complexity score 930 to generate final application code complexity score 932 using a scoring policy. The scoring policy also includes reference weights for different complexity scores and identifies an algorithm module to be applied to the weighted complexity scores to generate final application code complexity score 932.

Figures 10, 11:
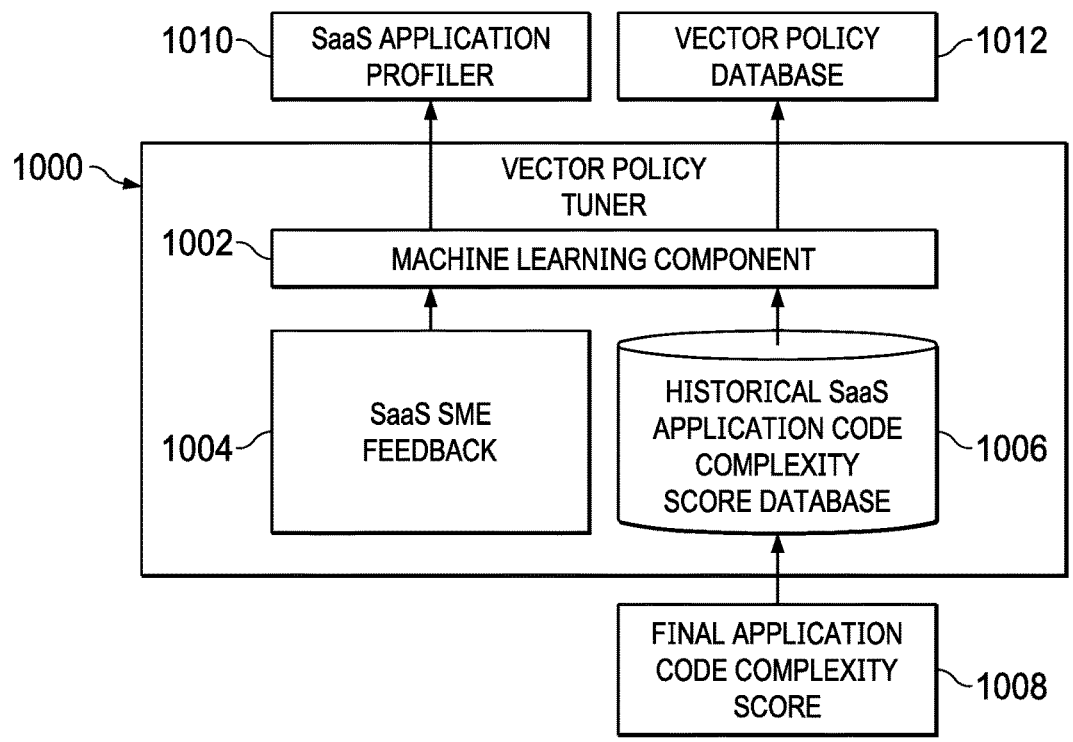
FIG. 10 is a diagram illustrating an example of a vector policy tuner in accordance with an illustrative embodiment.
FIG. 11 is a diagram illustrating an example of a complexity score computation table in accordance with an illustrative embodiment.

With reference now to FIG. 10, a diagram illustrating an example of a vector policy tuner is depicted in accordance with an illustrative embodiment. Vector policy tuner 1000 may be, for example, vector policy tuner 710 in FIG. 7. Vector policy tuner 1000 generates information that is used to optimize, update, or modify vector policies and their corresponding computational vectors. Vector policy tuner 1000 includes machine learning component 1002. Machine learning component 1002 may be, for example, an artificial intelligence program. Machine learning component 1002 receives as input information from SaaS subject matter expert feedback 1004 and historical SaaS application code complexity score database 1006.

SaaS subject matter expert feedback 1004 represents a set of responses to and/or comments on final application code complexity score 1008, which corresponds to a recently analyzed SaaS application that the subject matter expert is an authority on. In addition to storing final application code complexity score 1008, historical SaaS application code complexity score database 1006 contains a historical record of previous final application code complexity scores corresponding to that SaaS application and other similar SaaS applications.

Machine learning component 1002 utilizes the information in SaaS subject matter expert feedback 1004 and historical SaaS application code complexity score database 1006 to generate cognitive insights into the complexity of the SaaS application. Vector policy tuner 1000 sends the cognitive insights to SaaS application profiler 1010 and vector policy database 1012. SaaS application profiler 1010 may be, for example, SaaS application profiler 704 in FIG. 7 and vector policy database 1012 may be, for example, vector policy database 910 in FIG. 9. SaaS application profiler 1010 uses the cognitive insights to update computational vectors. Vector policy database 1012 uses the cognitive insights to update vector policies. Optionally, vector policy tuner 1000 may send the cognitive insights to a SaaS application code optimizer, such as, for example, SaaS application code optimizer 256 in FIG. 2, to decrease a complexity of the SaaS application.

With reference now to FIG. 11, a diagram illustrating an example of a complexity score computation table is depicted in accordance with an illustrative embodiment. Illustrative embodiments apply a time complexity algorithm module on the data contained in complexity score computation table 1100 to generate a complexity score for example computational vector C5. In this example, complexity score computation table 1100 includes vector input variables 1102, notations 1104, and values 1106. Notations 1104 and values 1106 correspond to each vector input variable listed in vector input variables 1102.

In this example, vector input variables 1102 include number of simple loops, number of loop counts per loop, number of nested loops, loop count (inner and outer), number of statements in simple loop, number of statements in nested loop, and number of statements in outside loop. Notations 1104 include 1, X, m, Y, x, y, and z. Values 1106 include 2, 5, 1, 1, 4, 5, and 10. In other words, number of simple loops has a notation of 1 and a value of 2, number of loop counts per loop has a notation of X and a value of 5, number of nested loops has a notation of m and a value of 1, loop count (inner and outer) has a notation of Y and a value of 1, number of statements in simple loop has a notation of x and a value of 4, number of statements in nested loop has a notation of y and a value of 5, and number of statements in outside loop has a notation of z and a value of 10.

The time complexity algorithm module calculates the vector variable total time. The time complexity algorithm module utilizes an equation, such as, for example: Total time=[X*ax+Y*by+dz], where the time complexity algorithm module takes as input (X, ax, Y, by, and dz). Illustrative embodiments apply a time policy on values 1106 of vector input variables 1102. The time policy identifies the particular computational vector (i.e., C5 in this example), includes time weights [1, 1, 1, 1, 5, 3, and 5], and identifies the time complexity algorithm module.

In this example, a=5, b=4, and d=5 and are the weights that illustrative embodiments apply for execution of statement inside loops and non-loops as per the time complexity algorithm module equation above. As a result, 1=2 (i.e., the vector input variable value)*1 (i.e., the corresponding time weight)=1, X=5*1=5, m=1*1=1, Y=1*1=1, x=4*5=20, y=5*3=15, and z=10*5=50. The time complexity score=5*20+1*15+50=165.

With reference now to FIG. 12, a flowchart illustrating a process for determining a metering metric for a SaaS application based on complexity of the SaaS application is shown in accordance with an illustrative embodiment. The process shown in FIG. 12 may be implemented in a computer, such as, for example, server 104 in FIG. 1, data processing system 200 in FIG. 2, or a cloud computing node in cloud computing nodes 310 in FIG. 3.

The process begins when the computer receives, from a SaaS provider, source code of an application to be executed by a server of a PaaS provider (step 1202). It should be noted that the server of the PaaS provider may be the same as the computer performing the process or may be a standalone server. In response to the computer receiving the source code in step 1202, the computer performs a static analysis of the source code without executing the application, thereby saving compute resources, such as processor cycles, memory, storage, and the like, of the computer (step 1204). The computer extracts values of parameters corresponding to the application based on the static analysis of the source code (step 1206).

Afterward, the computer generates a set of one or more computational vectors corresponding to the extracted values of the parameters of the application (step 1208). In addition, the computer retrieves a vector policy for each respective computational vector in the set of computational vectors (step 1210). The vector policy defines reference weights to be applied to corresponding parameter values of a particular computational vector and maps that particular computational vector and an algorithm module that is to be applied to weighted parameter values of that particular computational vector to generate a complexity score for that particular computational vector.

Further, computer applies a corresponding vector policy to each respective computational vector in the set of computational vectors to generate a corresponding complexity score for each respective computational vector in the set (step 1212). The computer aggregates complexity scores of the set of computational vectors to generate a final application code complexity score for the application using a complexity score policy (step 1214). The complexity score policy defines score weights to be applied to corresponding complexity scores of computational vectors in the set and a scoring algorithm to be applied to weighted complexity scores to generate the final application code complexity score.

Moreover, the computer determines a metering metric (i.e., service price) to be used to charge the SaaS provider for executing the application on the server of the PaaS provider based on the final application code complexity score for the application (step 1216). The computer sends the metering metric to the SaaS provider and the PaaS provider (step 1218). In addition, the computer executes the application at the metering metric based on the complexity of the code. Thereafter, the process terminates.

Thus, illustrative embodiments of the present invention provide a computer-implemented method, computer system, and computer program product for determining a metering metric for a SaaS application that is to be executed on a server of a PaaS provider based on analyzing a complexity of the source code corresponding to the SaaS application. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for metering based on application code complexity, the computer-implemented method comprising:

receiving, by a computer, code of an application to be executed from a user;

extracting, by the computer, values of parameters corresponding to the application based on analysis of the code;

generating, by the computer, a plurality of computational vectors, each computational vector corresponding to one or more extracted values of parameters of the application to calculate a complexity of the code, wherein at least one computational vector of the plurality of computational vectors represents multiple extracted values of parameters of the application, wherein each computational vector of the plurality of computational vectors is associated with a corresponding vector policy, and wherein each vector policy includes information used to determine the complexity of the code based on the one or more values of parameters represented by the computational vector corresponding to said each vector policy;

optimizing, by an optimizer of the computer, the application by the optimizer decreasing the complexity of the code based on analysis of a final application code complexity score corresponding to the application, wherein decreasing the complexity of the code increases performance of the computer by decreasing usage of computer resources needed to execute the application;

determining, by the computer, a metering metric to charge the user to execute the application based on the complexity of the code; and executing, by the computer, the application at the metering metric based on the complexity of the code.

2. The computer-implemented method of claim 1 further comprising:

performing, by the computer, a static analysis of the code without executing the application thereby saving compute resources of the computer.

3. The computer-implemented method of claim 1 further comprising:

retrieving, by the computer, a vector policy for each respective computational vector in the plurality of computational vectors, the vector policy defining reference weights to be applied to corresponding parameter values of a particular computational vector and a mapping between that particular computational vector and an algorithm module that is to be applied to weighted parameter values of that particular computational vector to generate a complexity score for that particular computational vector; and applying, by the computer, the corresponding vector policy to each respective computational vector in the plurality of computational vectors to generate a corresponding complexity score for each respective computational vector in the plurality of computational vectors.

4. The computer-implemented method of claim 1 further comprising:

aggregating, by the computer, complexity scores of the plurality of computational vectors to generate a final application code complexity score for the application using a complexity score policy.

5. The computer-implemented method of claim 1, wherein the computer is a server corresponding to a Platform as a Service provider, and wherein the application is a Software as a Service application of a Software as a Service provider, and wherein the user is a developer of the Software as a Service application.

6. The computer-implemented method of claim 1, wherein the complexity of the code includes application domain and environmental factors, and wherein the application domain is a field that the application is related to, and wherein the environmental factors include amount of processor, memory, and storage usage by the computer to execute the application.

7. The computer-implemented method of claim 1, wherein the code is source code of the application.

8. The computer-implemented method of claim 1 further comprising:

charging, by the computer, the user at the determined metering for executing the application.

9. A computer system for metering based on application code complexity, the computer system comprising:

a bus system;

a storage device connected to the bus system, wherein the storage device stores program instructions; and a processor connected to the bus system, wherein the processor executes the program instructions to:

receive code of an application to be executed from a user;

extract values of parameters corresponding to the application based on analysis of the code;

generate a plurality of computational vectors corresponding to extracted values of the parameters of the application to calculate a complexity of the code, wherein at least one computational vector of the plurality of computational vectors represents multiple extracted values of parameters corresponding to the application, wherein each computational vector of the plurality of computational vectors is associated with a corresponding vector policy, and wherein each vector policy includes information used to determine the complexity of the code based on the one or more values of parameters represented by the computational vector corresponding to said each vector policy;

optimize the application by an optimizer decreasing the complexity of the code based on analysis of a final application code complexity score corresponding to the application, wherein the optimizer decreasing the complexity of the code increases performance of the computer by decreasing usage of computer resources needed to execute the application;

determine a metering metric to charge the user to execute the application based on the complexity of the code; and execute the application at the metering metric based on the complexity of the code.

10. The computer system of claim 9, wherein the processor further executes the program instructions to:

perform a static analysis of the code without executing the application thereby saving compute resources of the computer system.

11. The computer system of claim 9, wherein the processor further executes the program instructions to:

retrieve a vector policy for each respective computational vector in the plurality of computational vectors, the vector policy defining reference weights to be applied to corresponding parameter values of a particular computational vector and a mapping between that particular computational vector and an algorithm module that is to be applied to weighted parameter values of that particular computational vector to generate a complexity score for that particular computational vector; and apply the corresponding vector policy to each respective computational vector in the plurality of computational vectors to generate a corresponding complexity score for each respective computational vector in the plurality of computational vectors.

12. The computer system of claim 9, wherein the processor further executes the program instructions to:

aggregate complexity scores of the plurality of computational vectors to generate a final application code complexity score for the application using a complexity score policy.

13. A computer program product for metering based on application code complexity, the computer program product comprising a computer readable storage medium having program instructions embodied therewith, the program instructions executable by a computer to cause the computer to perform a method comprising:

receiving, by the computer, code of an application to be executed from a user;

extracting, by the computer, values of parameters corresponding to the application based on analysis of the code;

generating, by the computer, a plurality of computational vectors corresponding to extracted values of the parameters of the application to calculate a complexity of the code, wherein at least one computational vector of the plurality of computational vectors represents multiple extracted values of parameters corresponding to the application, wherein each computational vector of the plurality of computational vectors is associated with a corresponding vector policy, and wherein each vector policy includes information used to determine the complexity of the code based on the one or more values of parameters represented by the computational vector corresponding to said each vector policy;

optimizing, by an optimizer of the computer, the application by the optimizer decreasing the complexity of the code based on analysis of a final application code complexity score corresponding to the application, wherein decreasing the complexity of the code increases performance of the computer by decreasing usage of computer resources needed to execute the application;

determining, by the computer, a metering metric to charge the user to execute the application based on the complexity of the code; and executing, by the computer, the application at the metering metric based on the complexity of the code.

14. The computer program product of claim 13 further comprising:

performing, by the computer, a static analysis of the code without executing the application thereby saving compute resources of the computer.

15. The computer program product of claim 13 further comprising:

retrieving, by the computer, a vector policy for each respective computational vector in the plurality of computational vectors, the vector policy defining reference weights to be applied to corresponding parameter values of a particular computational vector and a mapping between that particular computational vector and an algorithm module that is to be applied to weighted parameter values of that particular computational vector to generate a complexity score for that particular computational vector; and applying, by the computer, the corresponding vector policy to each respective computational vector in the plurality of computational vectors to generate a corresponding complexity score for each respective computational vector in the plurality of computational vectors.

16. The computer program product of claim 13 further comprising:

aggregating, by the computer, complexity scores of the plurality of computational vectors to generate a final application code complexity score for the application using a complexity score policy.

17. The computer program product of claim 13, wherein the computer is a server corresponding to a Platform as a Service provider, and wherein the application is a Software as a Service application of a Software as a Service provider, and wherein the user is a developer of the Software as a Service application.

18. The computer program product of claim 13, wherein the complexity of the code includes application domain and environmental factors, and wherein the application domain is a field that the application is related to, and wherein the environmental factors include amount of processor, memory, and storage usage by the computer to execute the application.

19. The computer program product of claim 13 further comprising:

charging, by the computer, the user at the determined metering for executing the application.

* * * * *